United States Patent [19]

Siga et al.

[11] Patent Number: 4,725,126
[45] Date of Patent: Feb. 16, 1988

[54] LENS RETAINING DEVICE

[75] Inventors: Naohito Siga; Naoyuki Seo; Takae Harutake; Michio Shirai, all of Hachioji, Japan

[73] Assignee: Olympus Optical Company Limited, Tokyo, Japan

[21] Appl. No.: 841,326

[22] Filed: Mar. 19, 1986

[30] Foreign Application Priority Data

Mar. 19, 1985 [JP] Japan .......................... 60-39450[U]

[51] Int. Cl.⁴ .............................................. G02B 7/02
[52] U.S. Cl. .................................................. 350/252
[58] Field of Search ............................. 350/252–253, 350/417, 318, 609, 631; 156/292; 65/58

[56] References Cited

U.S. PATENT DOCUMENTS 1,050,917  1/1913  Burleigh ............................. 350/252

FOREIGN PATENT DOCUMENTS 2731273  1/1979  Fed. Rep. of Germany ...... 350/252
1193329  11/1959  France .............................. 156/292
195811  11/1983  Japan ................................. 350/252
250315  12/1985  Japan ................................. 350/252
906278  9/1962  United Kingdom .............. 350/252

OTHER PUBLICATIONS

Richey, C. A. "Aerospace Mounts for Down-to-Earth Optics", Machine Design, 12-1974, pp. 121-127.

Primary Examiner—William H. Punter
Attorney, Agent, or Firm—Bruce L. Adams; Van C. Wilks

[57] ABSTRACT

A device for retaining a lens by a lens holding frame is disclosed, which comprises a plurality of non-adhesion portions formed on an outer periphery of the lens an inner periphery of the frame, and an adhesive inserted into portions other than the non-adhesion portions between the lens and the frame.

9 Claims, 9 Drawing Figures

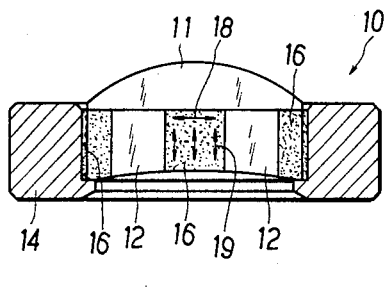
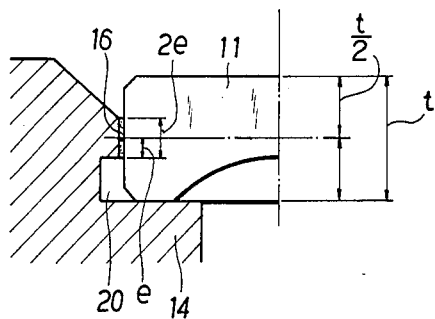
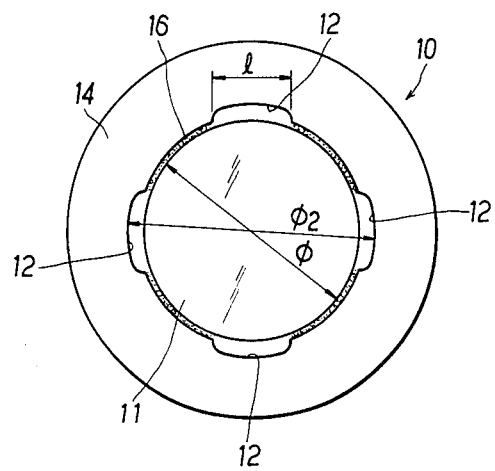
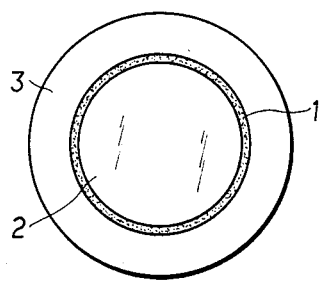
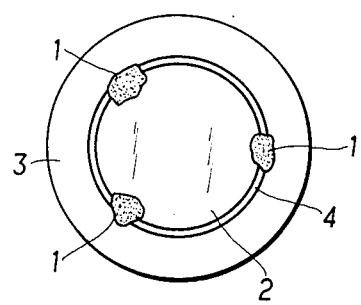

LENS RETAINING DEVICE

BACKGROUND OF THE INVENTION

1. Field of the Invention

This invention relates to an apparatus for retaining a lens, and more particularly to a lens retaining apparatus which retains a lens by a lens holding frame (or a lens barrel) through an adhesive.

2. Prior Art

As a structure for retaining a lens by a holding frame, there are adopted a means for fixing the lens to the holding frame through a screw, a caulking, a tap ring or the like without using an adhesive, and a means for dynamically holding the lens by synergistic action of a proper notch portion formed on the outer peripheral part of the lens outside its effective aperture and an elastic protrusion formed on the lens holding frame at a position corresponding to the notch portion.

In the means for fixing the lens to the holding frame, however, optical strain is produced in the lens due to the fixing force to considerably degrade the optical characteristics. On the other hand, in the dynamically holding means, the centering adjustment can not be performed at a high accuracy, which is not adoptable for the lens holding part requiring a high accuracy centering.

In the lens system requiring a relatively high accuracy centering, therefore, there is generally adopted a structure that a lens 2 is fixedly held at a lens barrel (or a holding frame) 3 through an adhesive 1 as shown in FIGS. 7a and 7b.

In the embodiment of FIG. 7a, the adhesive 1 is filled in a space defined between the outer peripheral surface of the lens 2 and the inner peripheral surface of the lens barrel 3 along its whole circumference. In the embodiment of FIG. 7b, the adhesive 1 is dottedly filled in a space 4 defined between the outer peripheral surface of the lens 2 and the inner peripheral surface of the lens barrel 3 at plural equi-distant or irregular positions.

In the above embodiments, an ultraviolet-curing type adhensive is used as the adhesive 1, so that the lens can be fixedly held at a centered state with a relatively high accuracy. However, there are the following problems.

Namely, the holding force (bonding strength) of the lens 2 is a product of bonding strength of the adhesive 1 by adhession area ($S = \pi D \times$ length of receiving portion, D: radius of lens). In this connection, the adhesion strength in FIG. 7a becomes excessively large due to the whole circumferential adhesion, so that the optical strain occurs in the lens 2 and consequently the optical characteristics after the fixing of the lens are considerably degraded as compared with the optical characteristics of the lens itself. In the embodiment of FIG. 7b, the adhesion strength may be set to a predetermined value. However, the dottedly applied adhesive 1 nonuniformly penetrates into the annular space 4 between the lens 2 and the lens barrel 3, so that there is caused the scattering in the adhesion strength among the dottedly applied portions of the adhesive 1, resulting in the increase of the optical strain.

SUMMARY OF THE INVENTION

It is an object of the invention to solve the aforementioned problems of the prior art and to provide a lens retaining apparatus wherein an adhesive can uniformly be applied at an area adaptable to a lens without scattering.

The above object and other objects of the invention can be achieved by forming a plurality of non-adhesion portions on an outer peripheral surface of a lens outside its effective aperture and/or an inner peripheral surface of a lens holding frame and retaining a lens by the remaining portions other than the non-adhesion portions on the outer peripheral surface of the lens and/or the inner peripheral surface of the lens holding frame through an adhesive.

BRIEF DESCRIPTION OF THE DRAWINGS

FIG. 4 is a sectional view of FIG. 1;

FIG. 5 is a partially enlarged sectional view of another embodiment of the main constructional part of FIG. 1;

FIG. 6 is a plan view of a second embodiment of the lens retaining apparatus according to the invention; and FIGS. 7a and 7b are schematically plan views of the conventional lens retaining apparatus, respectively.

DESCRIPTION OF THE PREFERRED EMBODIMENTS

The invention will be described in detail with reference to FIGS. 1 to 6.

Figure 1:
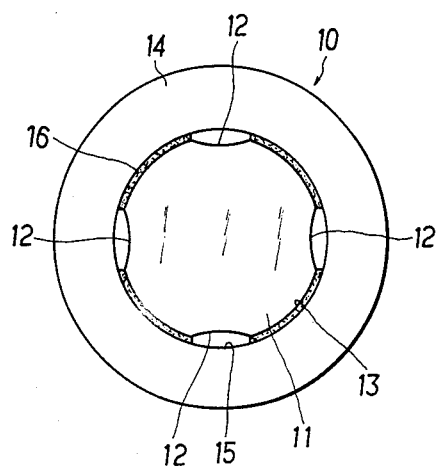
FIG. 1 is a plan view of a first embodiment of the lens retaining apparatus according to the invention.

FIG. 1 is a plan view of a first embodiment of the lens retaining apparatus 10 according to the invention.

As shown in FIG. 1, four arched dents 12 are formed on an outer periphery of a lens 11 at circumferentially equal intervals. The arched dent or indentation 12 defines a space or non-filling portion or non-adhesion portion for an adhesive 16 filled in a clearance defined between the outer peripheral surface 13 of the lens 11 and an inner peripheral circular surface or wall 15 of a lens holding frame or lens barrel 14. The number of arched dents 12 formed is determined in accordance with a size of the lens 11. The number of arched dents 12 in accordance with the lens size is set as shown in the following table in which $\phi$ represents a diameter of the lens in terms of mm units as shown in FIG. 2.

| Lens size ($\phi$) | Number of arched dents (number of notches at equal intervals) |
| --- | --- |
| $10 \geq$ | 3 |
| $10 < \phi \leq 20$ | 3–4 |
| $20 < \phi \leq 30$ | 3–5 |
| $30 < \phi \leq 40$ | 4–6 |
| $40 < \phi \leq 50$ | 4–7 |
| $50 < \phi \leq 80$ | 5–8 |
| $80 < \phi \leq 100$ | 6–12 |
| $100 < \phi$ | $6 \leq$ |

The number of arched dents 12 formed is set so as to reduce the optical strain of the lens 11 fixedly retained in the lens holding frame 14 through the adhesive 16 as small as possible. Namely, since the arched dent 12 forms the non-filling portion of the adhesive 16, the adhesion area of the lens 11 secured to the lens holding frame 14 comprises an outermost peripheral surface 17 of the lens between the adjacent arched dents 12. The adhesion area of the outer peripheral surface 17 of the lens enlarges in accordance with the increase of the lens size or reduces in accordance with the decrease of the lens size if the lens 11 is provided with the same number of the arched dents 12. Therefore, if the adhesion strength of the lens 11 is held at constant, it is necessary to increase the number of arched dents 12 as the lens size becomes large. Moreover, the number of arched dents 12 shown in the above table is particularly set so as to make the optical strain small for obtaining a high accuracy optical system or optical elements. If it is not necessary to provide a high accuracy, the number of arched dents may be reduced by 1-3 in accordance with the lens size. The symbol $\phi$ in the table represents a lens size.

Figure 2:
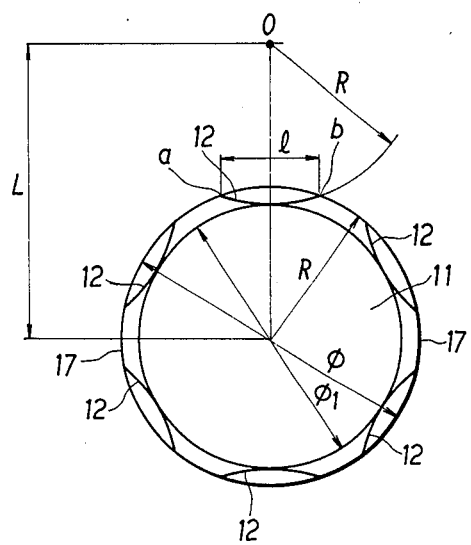
FIGS. 2, 3a and 3b are schematic views of main constructional parts of FIG. 1, respectively.

FIG. 2 shows a lens 11 when the number of arched dents 12 is 6 and the lens size is $40 < \phi \leq 50$. As shown in FIG. 2, the arched dent 12 is formed in the arc shape depicted from a position 0 separated by a central distance L at the same radius R as the radius R of the lens 11. The central distance L ia set to be $2R(\phi - \phi_1)/2$ (wherein $\phi$ is a size of a lens and $\phi_1$ is an effective aperture of the lens 11). Namely, the arc of the arched dent 12 is formed as a circle depicted from the point 0 tangent to the effective aperture of the lens 11, so that a length l of a chord between two points a and b intersecting the arc tangent to the effective aperture with the size of the lens 11 is set to become predetermined length.

Figure 3A:
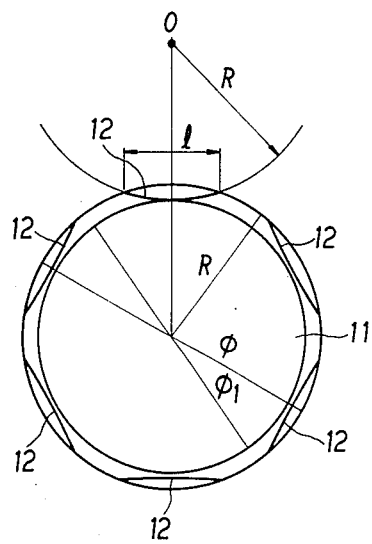
Figure 3B:
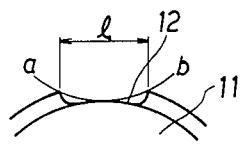

The arched dent 12 is not limited to the arc shape, and may be formed in a plane shape straightly connected between points a and b intersecting the arc of radius R tangent to the effective aperture of the lens 11 with the lens size thereof as shown in FIG. 3a. Alternatively, as shown in FIG. 3b, the dent 12 may be formed along the circle of the effective aperture of the lens 11. moreover, if the effective aperture and the chord length l are ensured, it is a matter of design to form the dent in any other shape.

In the above structure, the function of the invention will be described below.

The lens 11 is inserted into a lens receiving portion or opening of the lens holding frame 14, and then the adhesive 16 is applied in the clearance between the outer peripheral surface of the lens 11 other than the dents 12 and the inner peripheral surface of the lens holding frame 14 through an adhesive suppling machine (not shown) such as a dispenser or the like as shown in FIG. 1. Moreover, the adhesive 16 may be applied prior to the insertion of the lens 11.

The adhesive 16 penetrates into the clearance between the outer peripheral surface of the lens 11 and the inner peripheral surface of the lens holding frame 14. In this case, as shown in FIG. 4, the adhesive first spreads in right and left directions 18, but the spreading of the adhesive in right and left directions is controlled by the non-adhesion dents 12, and consequently the adhesive goes into the downward direction 19. Then, when the adhesive is filled in the whole adhesion area defined between the adjoining dents 12, the penetration of the adhesive 16 stops and the state of the adhesive 16 applied becomes stable.

After the filling of the adhesive, the adhesive 16 is cured. This curing is carried out by the irradiation of the ultraviolet rays in case of, for example, an ultraviolet-curing adhesive or ultraviolet-curing anaerobic adhesive, or carried out at a temperature from room temperature to middle temperature (heating) in case of a two-part reactive adhesive, or under a reaction (two-part) or humidity condtion in case of a silicone adhesive.

As shown in FIG. 5, an annular hollow recess 20 may be formed in the lens holding frame 14 in order to uniformly fill the adhesive 16 into the inner cylindrical peripheral surface of the lens holding frame 14 or to form a holding portion of a height 2e for holding the central part of the lens 11 with a thickness t. In this case, the adhesive 16 is filled more uniformly.

According to the above embodiment, therefore, the adhesion area formed between the adjoining dents 12 is uniformly distributed by properly selecting the length l of the dent 12, whereby the lens 11 is retained at a uniform adhesion strength. Further, the number of the dents 12 is set to reduce the optical strain of the lens 11 as small as possible, so that the optical strain of the lens 11 at the curing of the adhesive 16 is very small, resulting in the provision of high accuracy lens system.

In the above construction, an elastomer (e.g. urethane resin, styrol resin, silicone resin or the like) containing a foaming agent may be poured into and cured in the space defined between the dent 12 of the lens 11 and the lens holding frame 14 to improve humidity resistance, heat resistance and to function as a damper and the like of the lens system.

In FIG. 6 is shown a second embodiment of the invention, wherein the dent 12 is formed in the inner peripheral surface of the lens holding frame 14 instead of the lens 11. The shape and number of such a dent 12 are the same as in the first embodiment, and particularly the shape is not necessarily restricted if the length l of the dent 12 is properly selected. Further, the size $\phi_2$ between the opposed dents 12 is not necessary to be limited to a particular value as far as the adhesive 16 is not flowed out and $\phi_2$ satisfies the relation, $0.5 \text{ mm} \leq \phi_2 - \phi \leq 2 \text{ mm}$ based on the experimental results. In this case, the lens 11 is a circle. The second embodiment has the same construction as in the first embodiment except the dents.

According to the second embodiment of the above construction, the dent 12 is not formed in the lens 11, but formed in the frame 14 to achieve the same function and effect as in the first embodiment, so that there is caused no damage of the lens 11.

As mentioned above, according to the invention, the adhesion strength as a lens holding force may be set so as to make the optical strain minimum, and also the adhesion area may be made uniform so as to remove the the uneven adhesion strength, whereby there can be provided a lens retaining device having a very small optical strain at a stable holding force.

What is claimed is:

1. A device for retaining a lens comprising: frame means having an inner circular wall which defines an opening in the frame means for retaining therein a lens with an annular clearance between the inner circular wall and an outer periphery of the lens; means defining a plurality of spaces in at least one of the frame means and the lens, the spaces being circumferentially spaced along and opening into the clearance, and each space having a dimension in a radial direction of the lens larger than that of the clearance; and an adhesive filled in the clearance but not in the spaces for securing the lens to the frame means.

2. A device according to claim 1; wherein the frame means comprises a ring frame.

3. A device according to claim 1; wherein the frame means comprises a lens barrel.

4. A device according to claim 1; wherein the inner circular wall comprises a cylindrical wall.

5. A device according to claim 1; wherein the plurality of spaces are provided at an equal interval along the clearance.

6. A device according to claim 1; wherein the number of the spaces are determined according to the size of the lens.

7. A device according to claim 1, wherein the means defining the plurality of spaces comprises a plurality of indentations on the outer periphery of the lens.

8. A device according to claim 1; wherein the means defining the plurality of spaces comprises a plurality of indentations on the inner circular wall of the frame means.

9. A device according to claim 1; wherein the adhesive is selected from the group consisting of ultraviolet-curing type adhesives, ultraviolet-curing anaerobic adhesives, two-part reactive adhesives and silicon adhesives.

* * * * *